(12) United States Patent
Terradellas Callau et al.

(10) Patent No.: US 11,220,116 B2
(45) Date of Patent: Jan. 11, 2022

(54) CONVEYOR BELT SLIPPAGE

(71) Applicant: HEWLETT-PACKARD DEVELOPMENT COMPANY, L.P., Spring, TX (US)

(72) Inventors: Roger Terradellas Callau, Sant Cugat del Valles (ES); Inaki Zudaire Rovira, Sant Cugat del Valles (ES); Daniel Gutierrez Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 251 days.

(21) Appl. No.: 16/493,212

(22) PCT Filed: Jun. 12, 2017

(86) PCT No.: PCT/US2017/037009
§ 371 (c)(1),
(2) Date: Sep. 11, 2019

(87) PCT Pub. No.: WO2018/231189
PCT Pub. Date: Dec. 20, 2018

(65) Prior Publication Data
US 2021/0138800 A1    May 13, 2021

(51) Int. Cl.
*B41J 11/00* (2006.01)
*B41J 11/42* (2006.01)
(Continued)

(52) U.S. Cl.
CPC .............. *B41J 11/007* (2013.01); *B41J 11/42* (2013.01); *B65G 23/44* (2013.01); *B65G 43/04* (2013.01);
(Continued)

(58) Field of Classification Search
CPC ......... B41J 11/007; B41J 11/42; B65G 23/44; B65G 43/04; B65G 2203/0283; B65G 2203/0291; B65G 2203/044
See application file for complete search history.

(56) References Cited

U.S. PATENT DOCUMENTS 5,096,044 A * 3/1992 Biebel .................... B65G 39/16
198/502.4
5,903,805 A * 5/1999 Ueda ...................... B65G 39/16
399/165
(Continued)

FOREIGN PATENT DOCUMENTS

JP         S61248814 A      11/1986
JP         2014074877 A      4/2014

OTHER PUBLICATIONS

HPDC, "International Search Report and Written Opinion," Jun. 12, 2017, International App. No. PCT/US2017/037009, 8 p.

*Primary Examiner* — Gene O Crawford
*Assistant Examiner* — Keith R Campbell
(74) *Attorney, Agent, or Firm* — HP Inc. Patent Department

(57) ABSTRACT

In one example, a method of controlling a printing system is described, the method comprising activating a driver to advance a conveyor belt in a plurality of sub-turns. For each of the plurality of sub-turns, a first parameter associated with movement of the conveyor belt is determined, based on data obtained from the driver. For each of the plurality of sub-turns, a second parameter associated with movement of the conveyor belt is also determined, based on data obtained from an optical sensor. A per-sub-turn slippage parameter is calculated for each of the plurality of sub-turns, based on any difference between the first parameter and the second parameter. The method further comprises calculating a slippage metric based on the per-sub-turn slippage parameters (Continued)

for the plurality of sub-turns, and causing outputting of a conveyor belt tension adjustment indication.

15 Claims, 4 Drawing Sheets

(51) Int. Cl.
*B65G 23/44* (2006.01)
*B65G 43/04* (2006.01)
(52) U.S. Cl.
CPC ............... *B65G 2203/0291* (2013.01); *B65G 2203/044* (2013.01)

(56) References Cited

U.S. PATENT DOCUMENTS

| | | |
|---|---|---|
| 5,927,194 A | 7/1999 | Jeschke |
| 6,158,576 A * | 12/2000 | Eagles ................. D21F 1/0027 198/810.01 |
| 6,457,709 B1 | 10/2002 | Madsen et al. |
| 7,293,641 B2 | 11/2007 | Toya et al. |
| 8,023,872 B2 | 9/2011 | Tao et al. |
| 8,047,355 B2 | 11/2011 | Ricciardi, Sr. et al. |
| 8,351,830 B2 | 1/2013 | Kudo et al. |
| 8,770,878 B2 | 7/2014 | Leighton et al. |
| 9,440,800 B1 * | 9/2016 | Rimmington ............. F16D 7/00 |
| 10,518,563 B2 * | 12/2019 | Terradellas Callau ....................... B41J 11/007 |
| 10,940,704 B2 * | 3/2021 | Terradellas Callau ....................... B41J 13/0009 |
| 2010/0108733 A1 | 5/2010 | Fuwa |

* cited by examiner

CONVEYOR BELT SLIPPAGE

BACKGROUND

Conveyor belts for printers may be arranged to move print media in a printing system in coordination with printing components to produce a printed image or generate an object. The conveyor belt supports and moves the print media during printing. The conveyor belt may be positioned around rollers in an assembly which may include a driving mechanism to apply a force to the conveyor belt to cause it to move on the rollers.

BRIEF DESCRIPTION OF THE DRAWINGS

Various features of the present disclosure will be apparent from the detailed description which follows, taken in conjunction with the accompanying drawings, which together illustrate certain examples, and wherein.

DETAILED DESCRIPTION

Figure 1:
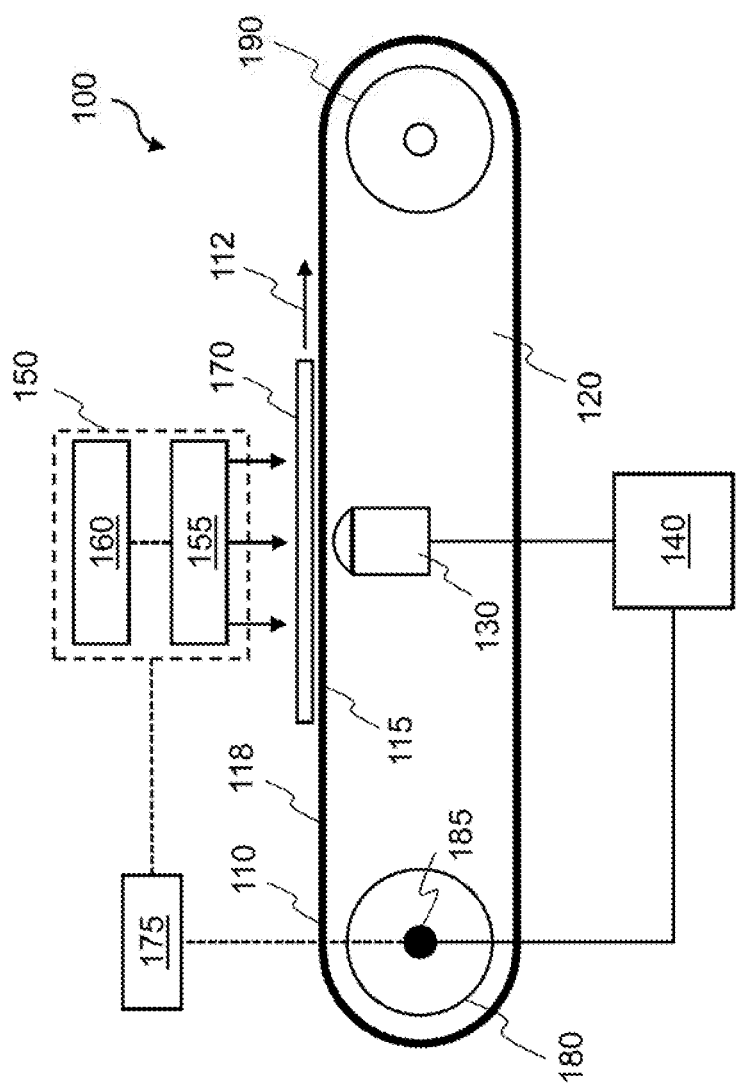
FIG. 1 is a schematic illustration showing a printing system according to an example.

Certain examples described herein relate to printing systems with a conveyor belt to convey print media. In some examples, the printing system may be a two-dimensional (2D) printing system such as an inkjet or digital offset printer. In these examples, the print media may comprise paper, cardstock, boards, metal sheets, plastic sheets, and the like. A sheet of print media may rest on top of the conveyor belt and be driven through a print zone. In the print zone, printing fluid may be applied, e.g. using inkjet print heads mounted above the conveyor belt. In other examples, the printing system may be a three-dimensional (3D) printing system, otherwise known as an additive manufacturing system. In these examples, the print media may comprise a build material. For example, the build material may be deposited on top of the conveyor belt and be driven through the additive manufacturing system. Some additive manufacturing systems use a "layer-by-layer" approach, where a solidification process is applied to each layer of deposited build material before the next layer of build material is applied. In certain printing systems, a vacuum mechanism may be used to secure the print media to the conveyor belt via suction.

In printing systems, the conveyor belt may slip in its position with respect to other components of the system, for example any rollers that are used to tension and transmit movement to the belt, due to a tension of the conveyor belt being too low. Additionally or alternatively, changes in ambient temperature or humidity in the surroundings of the conveyor belt may cause the conveyor belt to expand or contract in size and change in its tension. Tension changes in the conveyor belt may also be caused by relaxation of the conveyor belt material over time, or during transportation of the conveyor belt, as examples.

A reduced tension of the conveyor belt can lead to the belt slipping with respect to a driver that contacts the conveyor belt (either directly or via intermediate components) to apply a force to the conveyor belt in order to move it. For example, the driver may comprise a drive roller, which the conveyor belt is disposed about, and which rotates to move the conveyor belt. This phenomenon of the conveyor belt slipping with respect to the driver or other mechanisms involved in moving the conveyor belt (e.g. other rollers) is herein referred to as "slippage".

Slippage of the conveyor belt during a print job of the printing system can lead to errors when rendering an image on print media in accordance with the print job. Image quality may be negatively affected, and undesired effects on the rendered image may be produced. For example, errors in the advancement of the conveyor belt in the conveyance direction (in which it moves print media through the printing system) can cause misalignment between the print media and components of the printing system (e.g. a print engine to apply printing material to the print media). Such misalignment can cause defects such as banding or streaking in the rendered image, where too much or too little printing material is applied to the print media in certain locations.

Parameterizing an amount of slippage occurring in the printing system, as described herein with respect to examples, allows the amount of slippage to be compared to predefined tolerances. This comparison can provide an indication of whether the amount of slippage is tolerable, i.e. within the predefined tolerance(s), or is too high. If the amount of slippage is too high, this can indicate that the tension of the conveyor belt should be increased to reduce the amount of slippage.

Some approaches to systems and methods for inferring an amount of slippage of the conveyor belt involve specialized equipment, for example a tool that measures deflection of the conveyor belt when placed on top of it. The deflection of the conveyor belt is related to the belt tension, and so the amount of deflection is used to diagnose any deviation in the belt tension, from a desired tension, that has occurred. However, this process is an indirect measure of slippage and assumes that different conveyor belt assemblies will exhibit the same behavior under the same conditions.

Certain examples described herein act to directly measure an amount of slippage occurring in a printing system, and indicate the measured amount of slippage and/or whether the conveyor belt tension should be adjusted.

Examples described herein may be run as a diagnostic test on or by the printing system. For example, if printing errors are observed, the printing system may be taken offline, that is, not in a running mode to execute a print job. When the printing system is offline, or in a diagnostic mode, the conveyor belt can move as it would during a print job but the print engine may not operate, so that printing material is not applied to print media.

In examples, first and second parameters associated with movement of the conveyor belt may be determined. These parameters can be determined from different sources of data relating to movement of the conveyor belt. For example, the first parameter may be determined based on first data obtained from a driver (or an encoder associated therewith) for moving the conveyor belt, and the second parameter may be determined based on second data obtained from an optical sensor tracking movement of the conveyor belt.

Where no slippage occurs, the first and second parameters (which may each be e.g. a distance travelled by, or a velocity of, the conveyor belt) should correspond. The first data based on motion of the driver (which may comprise a drive roller and/or a drive shaft) may be used to determine the first parameter associated with movement of the conveyor belt.

This determination can assume that there is no slippage between the conveyor belt and the driver or other components that the conveyor belt moves on (e.g. idle rollers). The second data based on detected movement of the conveyor belt (e.g. by an optical sensor) may be used to determine the movement of the conveyor belt directly, and therefore the second parameter may be a more accurate measurement of the movement of the conveyor belt than the first parameter.

Therefore, any discrepancy beyond an established threshold between the first and second parameter values may be attributed to slippage of the conveyor belt. Slippage may be parameterized using the first and second parameters for each sub-turn of a conveyor belt, where a sub-turn may be considered to be a discrete advancement of the conveyor belt in the conveyance direction. For example, a complete revolution or turn of the conveyor belt, about an assembly of rollers on which it moves, may comprise a series of sub-turns.

A slippage metric for a plurality of sub-turns may be calculated based on the slippage parameters for each sub-turn. Predefined thresholds may be set for the slippage parameter for each sub-turn and/or the slippage metric for the plurality of sub-turns. If a predefined threshold is exceeded, an indication may be caused as part of the diagnostic test (e.g. a signal transmitted), which indicates that the slippage occurring in the printing system is too high and/or that the tension of the conveyor belt should be increased to reduce slippage.

The diagnostic testing may be run after the printing system has been idle (not printing) for a time period, since a lower ambient temperature can cause a lowering of the conveyor belt tension due to physical properties of the conveyor belt. As the printing system heats up during printing operations (e.g. from waste heat produced by mechanical components of the printing system) the conveyor belt tension may increase and act to reduce slippage.

The diagnostic test may comprise tracking the slippage during a complete belt turn (comprising a plurality of intermittent sub-turns) with the conveyor belt advancing as it would during a printing operation. As previously described, the printing system may be in an offline or diagnostic mode, where the print engine and any drying or curing devices are deactivated.

The diagnostic testing may be iterative, such that it is rerun following any adjustment made to the tension of the conveyor belt. Therefore, the new conveyor belt tension following any adjustment can be tested to determine if slippage has been reduced to within the predefined threshold(s) or tolerance(s).

With such diagnostic testing, simple troubleshooting can be run, for example after identification of a degradation in image quality, to determine whether the conveyor belt is operating at its designed tension. Continuous recalibration and/or adjustment of the conveyor belt tension may not be employed, so that the printing system can continue to operate, producing a more consistent image quality, while the slippage is measured to be within predefined tolerances. Therefore, printing operations may not be frequently interrupted or delayed for tensioning of the conveyor belt. Printing system installation may also be quickened, as the diagnostic testing may be run to check the conveyor belt tension following installation. This may be used to offset any belt tension variations during transportation prior to installation.

Certain examples will now be described with reference to the Figures.

FIG. 1 shows schematically a printing system 100. The printing system 100 comprises a conveyor belt 110. The conveyor belt 110 may include a loop or band of material with sufficient flexibility to bend or deform around rollers for moving the conveyor belt 110. In some examples, the conveyor belt 110 can include segmented rigid or semi-rigid sections coupled to one another by hinged connectors.

The printing system comprises a driver 185 to advance the conveyor belt 110. The driver 185 may comprise a motor or a motorized shaft, for example. The driver 185 may comprise a drive roller 180, as shown in FIG. 1. The drive roller 180 can apply a force to the conveyor belt 110 that causes it to move about the drive roller 180 and an idle roller 190, for example. As such, rotational movement of the drive roller 180 can be translated into corresponding linear motion of the conveyor belt 110. The linear motion of the conveyor belt 110 can then be used to move material disposed thereon.

The driver 185 advances the conveyor belt 110 in a plurality of intervals or sub-turns. The conveyor belt 110 may be advanced by the driver 185 in a conveyance direction 112 in a complete revolution or turn of the belt 110 around the rollers 180, 190 during a print job of the printing system 100. The complete turn of the conveyor belt 110 may comprise the plurality of sub-turns. Each sub-turn may be a discrete movement of the conveyor belt 110 from a first position to a second position, the second position displaced from the first position in the conveyance direction 112. For example, the conveyor belt 110 may start moving at the beginning of a sub-turn, and stop moving at the end of the sub-turn.

In examples, the conveyor belt 110 is elongate with a length in the conveyance direction 112 that the conveyor belt 110 moves in, and a lateral dimension or width in a direction perpendicular to the conveyance direction 112, wherein the length may be larger than the width.

The conveyor belt 110 may include an interior surface 115 and an exterior surface 118. The exterior surface can be used as a surface on which materials, media, or objects are carried, for example print media 170. The object may be held to the exterior surface by gravity, friction, clamps, or vacuum. The interior surface 115 may be considered the surface of the conveyor belt 110 in contact with or disposed in proximity to the rollers on which the conveyor belt moves. As such, the conveyor belt 110 can define an interior and exterior relative to the conveyor belt 110. For example, the region within the confines of the loop of the conveyor belt 110 and proximate to the interior surface 115 of the conveyor belt 110 can be referred to herein as the conveyor belt interior 120.

In some examples, the print system 100 can include a vacuum handler (not shown), positioned in the conveyor belt interior 120, to exert vacuum pressure on an object (e.g. print media 170) disposed on the exterior surface 118 of the conveyor belt 110 to hold the print media 170 in place against the conveyor belt 110. In such examples, the conveyor belt 110 can include openings, channels, or holes through which the vacuum handler can apply the vacuum to the print media 170. The vacuum handler can thus provide a force that increases the friction between the print media 170 and the exterior surface 118 of the conveyor belt 110, to prevent the print media 170 disposed on the exterior surface 118 of the conveyor belt 110 from slipping as the conveyor belt 110 moves. As such, when the conveyor belt 110 moves, it can be assumed that the print media 170 also moves with no slippage. For example, the vacuum handler can hold print media 170 (such as paper, cardstock, boards, metal sheets, plastic sheets, and the like) securely to the exterior surface 118 of the conveyor belt 110 so that when the conveyor belt 118 moves, the print media 170 also moves without slipping, curling, or lifting.

The printing system 100 comprises an optical sensor 130. The optical sensor 130 may be located proximate to the conveyor belt 110, for example the interior surface 115 of the conveyor belt 110. The optical sensor 130 can optically detect movement of the conveyor belt 110.

In various examples, the optical sensor 130 can include a light sensor or complementary optical components for detecting the movements of the conveyor belt 110 (e.g. the interior surface 115 of the conveyor belt 110). For example, the optical sensor 130 may include a complementary metal-oxide semiconductor (CMOS) sensor, a charge coupled device (CCD) sensor, a photomultiplier, or any type of light-sensitive electronic device. The optical components of the optical sensor 130 can include any configuration of lenses, light guides, optical fibers, mirrors, etc.

In some examples, the optical sensor 130 may also include a light source (not shown), such as an LED, an incandescent lamp, a laser, or the like, to illuminate the conveyor belt 110 (e.g. the interior surface 115 of the conveyor belt 110). In other examples, the light source may be a separate device and directed toward the region that the optical sensor 130 is intended to detect. The spectral content of the light source can be specifically selected to increase the detectability of the movement of the conveyor belt 110.

In other examples, instead of, or in addition to, detecting light reflected off the conveyor belt 110 (e.g. the interior surface 115 of the conveyor belt 110), the optical sensor 130 may detect light that passes through the conveyor belt 110. For example, in examples in which the conveyor belt 110 includes perforations, holes, or other gaps, the optical sensor 130 may detect differentials in light that passes through the conveyor belt 110 as it moves. In such examples, a light source can be disposed in proximity to the exterior of the conveyor belt 110 to provide the "bright" light signal reference point.

In some examples, the optical components can include lenses that include profiles and optical power to conform to or match the shape and/or dimensions of the conveyor belt 110 (e.g. the interior surface 115 of the conveyor belt 110). For example, optical components of the optical sensor 130 can include a light guide or lens disposed in close proximity to conveyor belt 110 to detect variations in the light received from or through the conveyor belt 110. The same or complementary optical components can be used to guide or focus light from a light source onto a region of the conveyor belt 110 monitored by the optical sensor 130.

In some examples, the optical components may include an imaging lens focused on the inherent pattern, texture, or grain of the material of the conveyor belt 110.

In other examples, the interior surface 115 of the conveyor belt 110 can include regularly or randomly arranged markings that provide contrasting levels of reflectance relative to the inherent reflectance of the material of the conveyor belt 110. For example, the markings can include a series of regularly spaced dots, lines, or hash marks, imprinted on the interior surface 115 of the conveyor belt 110. In such examples, the markings can be made with a printing fluid, paint, pigment, or other material that is lighter than or darker than the material of the conveyor belt 110 so as to provide contrasting reflectance.

In some examples, the markings can include a material that has a different specular reflectance characteristic (e.g. shininess) relative to the material of the conveyor belt 110. For example, the markings can be glossy while the material on the interior of the conveyor belt 110 is matte. For example, the interior surface 115 or exterior surface 118 of the conveyor belt 110 can be embedded with shiny metal pieces (e.g. foil) that may be more reflective than the surrounding material (e.g. rubber, fabric, etc.) in the conveyor belt interior 120 or exterior. As such, the light received by the optical sensor 130 from the conveyor belt 110 can be reflected off the respective surface and any markings thereon.

In some cases, the optical sensor 130 (possibly in conjunction with one or more image processing components and/or one or more image processing operations) may take photos of the interior surface 115 or exterior surface 118 of the conveyor belt 110 during a sub-turn of the conveyor belt 110. The optical sensor 130 can process the photos internally to compare consecutive photos and evaluate a displacement of the conveyor belt 110 that has occurred during the sub-turn.

As the conveyor belt 110 moves in the conveyance direction 112, comparing photos taken of the conveyor belt 110 by the optical sensor 130 can be interpreted as movement of the belt 110 in the conveyance direction 112. In alternative examples, variations in light reflected off the conveyor belt 110 and detected by the optical sensor 130 can be interpreted as movement of the belt 110 in the conveyance direction 112. Thus, the variations in the reflected light detected by the optical sensor 130 can be interpreted as movement of the conveyor belt 110 in the region of the belt 110 that the optical sensor 130 is intended to detect. In some examples, the detected movement of the conveyor belt 110 may additionally or alternatively be lateral (that is, in a direction perpendicular to the conveyance direction 112). In some examples, the printing system 100 may comprise a plurality of optical sensors 130 to optically detect movement of the conveyor belt 110.

The printing system 100 comprises a diagnostic module 140 to determine a first parameter associated with movement of the conveyor belt 110 based on data from the driver 185. For example, the data from the driver 185 may be associated with a velocity of the driver 185 (e.g. an angular velocity of the drive roller 180) measured by an encoder (not shown) coupled to the driver 185. The data may be received by the diagnostic module 140 from the driver 185 or the encoder. In examples employing a drive roller 180, the encoder may be a shaft encoder associated with a driver 185 comprising a motorized shaft for moving the drive roller 180. In other examples, the data may be processed by a processor associated with the driver 185 to determine the first parameter, and the first parameter value may be sent from the driver processor to the diagnostic module 140.

The diagnostic module 140 also determines a second parameter associated with movement of the conveyor belt 110 based on data from the optical sensor 130. As previously described, movement of the conveyor belt 110 can be optically detected by the optical sensor 130. Data associated with this optically detected movement of the conveyor belt 110 can be sent from the optical sensor 130 to the diagnostic module 140. The diagnostic module 140 may receive and process the data to determine the second parameter. In other examples, the data may be processed by a processor associated with the optical sensor 130 to determine the second parameter, and the second parameter value may be sent from the optical sensor processor to the diagnostic module 140.

In examples, for each of the plurality of intervals that the driver 185 advances the conveyor belt 110, the diagnostic module 140 calculates a per-interval slippage parameter based on any difference between the first parameter and the second parameter.

In some examples, the first parameter may comprise a first distance travelled by the conveyor belt 110 during an interval, as determined by the diagnostic module 140 based on data from the driver 185 for the interval. The first distance may be a linear distance travelled by the conveyor belt 110. For example, where a drive roller 180 is employed, a linear speed at a perimeter of the drive roller 180 may be determined based on an angular velocity or frequency (in revolutions per unit time) of the drive roller (e.g. as measured by an encoder). The linear speed of the drive roller 180 at its perimeter is related to the angular speed of the drive roller 180 by a factor of its radius. The first distance travelled by the conveyor belt 110 during an interval may then be determined based on the linear speed of the drive roller 180 at its perimeter (where the conveyor belt 110 contacts the drive roller 180) and a time period that the interval lasts for.

The second parameter may comprise a second distance travelled by the conveyor belt 110 during the interval, as determined by the diagnostic module 140 based on data from the optical sensor 130. The data from the optical sensor 130 can comprise optically detected movement of the conveyor belt 110, which may be converted to a distance measurement. In these examples, the diagnostic module 140 can then calculate a slippage parameter for the interval based on any difference between the determined first and second distances travelled by the conveyor belt 110. For example, if the first distance was determined to be 1.2 mm and the second distance was determined to be 1.1 mm, for a particular interval, then the slippage parameter would be 0.1 mm for the interval. In cases where there is no difference between the determined first and second parameters for an interval, the slippage parameter would have a zero value (e.g. 0 mm).

In other examples, the first parameter may comprise a first linear velocity of the conveyor belt 110 during an interval. As described above, where a drive roller 180 is employed, a linear velocity at a perimeter of the drive roller 180 may be determined based on an angular velocity or frequency (in revolutions per unit time) of the drive roller (e.g. as measured by an encoder).

The second parameter may comprise a second linear velocity of the conveyor belt 110 during the interval, as determined by the diagnostic module 140 based on data from the optical sensor 130. The data from the optical sensor 130 can comprise optically detected movement of the conveyor belt 110, which may be converted to a linear velocity measurement. For example, from optically detected movement of the conveyor belt 110 it may be determined that the conveyor belt 110 moved a distance d over a time period t during the interval. An average linear velocity for the interval can then be determined based on the values of d and t.

In these examples, the diagnostic module 140 can calculate a slippage parameter for the interval based on any difference between the determined first and second linear velocities of the conveyor belt 110. For example, if the first linear velocity was determined to be 2.7 m/s and the second linear velocity was determined to be 2.5 m/s, for a particular interval, then the slippage parameter would be 0.2 m/s for the interval. In cases where there is no difference between the determined first and second parameters for an interval, the slippage parameter would have a zero value (e.g. 0 m/s).

The diagnostic module 140 calculates a slippage metric based on the per-interval slippage parameters for the plurality of intervals. In some examples, the diagnostic module 140 may aggregate the per-motion slippage parameters for the plurality of motions of the driver 185. For example, in examples where the per-motion slippage parameters are determined as lengths or distances, each from a difference between first and second determined distances moved by the conveyor belt 110, the slippage metric may be the aggregate distance calculated from the per-motion slippage parameters for the plurality of motions. This aggregate slippage metric may be considered a "total slippage". For example, if the plurality of motions of the driver 185 make a complete turn or revolution of the conveyor belt 110, the slippage metric may be the total slippage for the complete turn or revolution of the conveyor belt 110.

In other examples where the per-motion slippage parameters are determined as linear velocities, each from a difference between first and second determined linear velocities of the conveyor belt 110, the slippage metric may be the aggregate linear velocity calculated from the per-motion slippage parameters for the plurality of motions. The total slippage may therefore be a linear velocity value aggregated from the per-motion differences between the linear velocities of the conveyor belt 110 as determined from: data from the driver 185; and data from the optical sensor 130.

In other examples, the diagnostic module 140 calculates the slippage metric by, for each of the plurality of motions of the driver 185, comparing the per-motion slippage parameter to a predetermined threshold and calculating a proportion of the plurality of motions where the predetermined threshold is exceeded.

For example, where the per-motion slippage parameters are determined as distances, for each motion of the driver 185, the slippage distance (that is, the difference between first and second determined distances moved by the conveyor belt 110) may be compared to a threshold distance value. The proportion of the plurality of motions where the threshold is exceeded may then be calculated. As an example, if there were 50 motions of the driver, and 40 of the motions had a slippage distance greater than the threshold (e.g. 0.1 mm) then the slippage metric may be calculated as 40/50 or 80%. This slippage metric may be considered a "slippage variability". In other examples, the slippage variability metric may be determined as a proportion of the plurality of motions where the predetermined threshold is not exceeded (e.g. 20% in the preceding example).

Similarly, where the per-motion slippage parameters are determined as linear velocities, for each motion of the driver 185, the slippage velocity (that is, the difference between first and second determined linear velocities of the conveyor belt 110) may be compared to a threshold velocity value. The proportion of the plurality of motions where the threshold is exceeded may then be calculated as in the preceding example.

The diagnostic module 140 also, based on a comparison of the slippage metric to a predetermined threshold value, causes a conveyor belt tension adjustment indication. For example, the determined slippage metric value (e.g. total slippage or slippage variability) is compared to the predetermined threshold value, and if the threshold is exceeded, the diagnostic module 140 causes a conveyor belt tension adjustment indication.

The conveyor belt tension adjustment indication may comprise an indication by an output device, such as an LED or other light-emitting device, a visual display or monitor, an audio speaker or another means of signaling to a person (or a combination of multiple such indications). The conveyor belt tension adjustment indication is a communication (e.g.

by the output device) that the tension of the conveyor belt 110 may be adjusted, for example to reduce slippage. For example, if the determined slippage metric value is above the predetermined threshold value, the conveyor belt tension adjustment indication may indicate that the tension of the conveyor belt 110 is too low and may be increased to reduce slippage.

Some conveyor belt materials can expand, contract, or experience other changes in a physical property or properties, when subjected to heating and cooling. Expansion and contraction of the conveyor belt 110 can alter the width, or potentially change the coefficient of friction or elasticity of the conveyor belt 110, for example. Such physical changes to the conveyor belt 110 may in some cases cause the belt 110 to slip on the rollers. In some cases, the belt 110 may slip on the rollers 180, 190 due to incorrect tensioning of the conveyor belt 110 about the rollers 180, 190. Information regarding determined slippage of the conveyor belt 110, based on: inferred movement of the conveyor belt 110 based on movement of the driver; and optically detected movement of the conveyor belt 110 by the optical sensor in a localized region; can be used to determine if re-tensioning of the conveyor belt 110 should be carried out.

For example, in various examples, the optical sensor 130 can be located proximate to a region of the interior surface 115 of the conveyor belt 110 opposite a region of the exterior surface 118 of the conveyor belt 110 that is near a print engine 150. The region of the exterior surface 118 of the conveyor belt 110 near a print engine 150 is referred to herein as the "print zone". The print engine 150 may comprise circuitry to receive instructions for applying printing material to the print media 170. The print engine 150 may comprise a print head that can eject printing material, and the print head may be controlled based on the instructions, for example in its physical positioning and/or ejection of printing material. In such examples, use of the optical sensor 130 can determine movement of the conveyor belt 110 that may be affected by uneven or localized heating in the print zone. For example, some printing technologies, such as large format latex printing, piezoelectric inkjet printing, thermal inkjet printing, and other printing technologies that use heat in some part of the printing process (e.g., during the application, drying, or curing of print material) in the print zone or other region of the conveyor belt 110, can cause the conveyor belt 110 and/or print media 170 conveyed by the belt 110 to heat up and cool down unevenly.

Such uneven heating and cooling, and heating and cooling generally, of the conveyor belt 110 can lead to the tension of the conveyor belt 110, in the conveyance direction 112, becoming too low. With the tension too low, the conveyor belt 110 can slip on the rollers 180, 190 which can misalign the print media 170 (conveyed by the conveyor belt 110) and the print engine 150. Such misalignment during a print job can lead to printing errors and reduced image quality. The present printing system 110 allows a diagnostic test to be run to determine the extent of any slippage of the conveyor belt 110 over a plurality of intervals or advancements, and therefore indicate if the tension of the conveyor belt 110 should be increased.

In some examples, a print engine 150 of the printing system 100 may comprise, or be communicatively coupled to, a buffer 160 to store print data associated with a print job. The print data can include information or encoded data that can be used to render an image on the print media 170 with the print engine 150. The printing system 100 may include a print controller to generate instructions, based on the print data. The instructions may be for controlling the print engine 150 to apply a printing material to the print media 170 to generate a corresponding printed image. In some examples, the instructions generated based on the print data in the buffer 160 may be applied to a print head (or print heads) 155 as part of the print engine 150. The print heads 155 may apply printing material or printing fluid (such as ink) to the print media 170, based on the generated instructions, during the print job of the printing system 100. In some cases where print heads 155 are implemented, the print heads 155 may move laterally, or side-to-side, as the conveyor belt 110 moves intermittently in the conveyance direction 112.

The diagnostic module 140 can include electronic circuitry, for example a processor and a memory. Computer executable code that includes instructions for performing various operations of the diagnostic module 140 described herein can be stored in the memory. For example, the functionality for controlling or interacting with the optical sensor 130 can be implemented as executable optical sensor control code stored in the memory and executed by the processor. Similarly, the functionality for interacting with the driver 185 or encoder can be implemented as executable driver interaction code or encoder interaction code, respectively, and stored in the memory and executed by the processor. As such, the executable code stored in the memory can include instructions for operations that, when executed by the processor, cause the processor to implement the functionality described in reference to the example diagnostic module 140.

Similarly, the print controller can also include electronic circuitry such as a processor and a memory. Computer executable code that includes instructions for performing various operations of the print controller can be stored in the memory. For example, the functionality for driving the drive roller 180 or driver 185, and controlling the print engine 150 can be implemented as executable conveyor belt drive code and print engine control code, respectively, and stored in the print controller memory and executed by the print controller processor.

A processor, as described herein, may be a microprocessor, a micro-controller, an application specific integrated circuit (ASIC), or the like. In examples, a processor is a hardware component, such as a circuit.

A memory, as described herein, can include any type of transitory or non-transitory computer readable medium. For example a memory can include volatile or non-volatile memory, such as dynamic random access memory (DRAM), electrically erasable programmable read-only memory (EEPROM), magneto-resistive random access memory (MRAM), memristor, flash memory, a floppy disk, a compact disc read only memory (CD-ROM), a digital video disc read only memory (DVD-ROM), or other optical or magnetic media, and the like, on which executable code may be stored.

Figure 2:
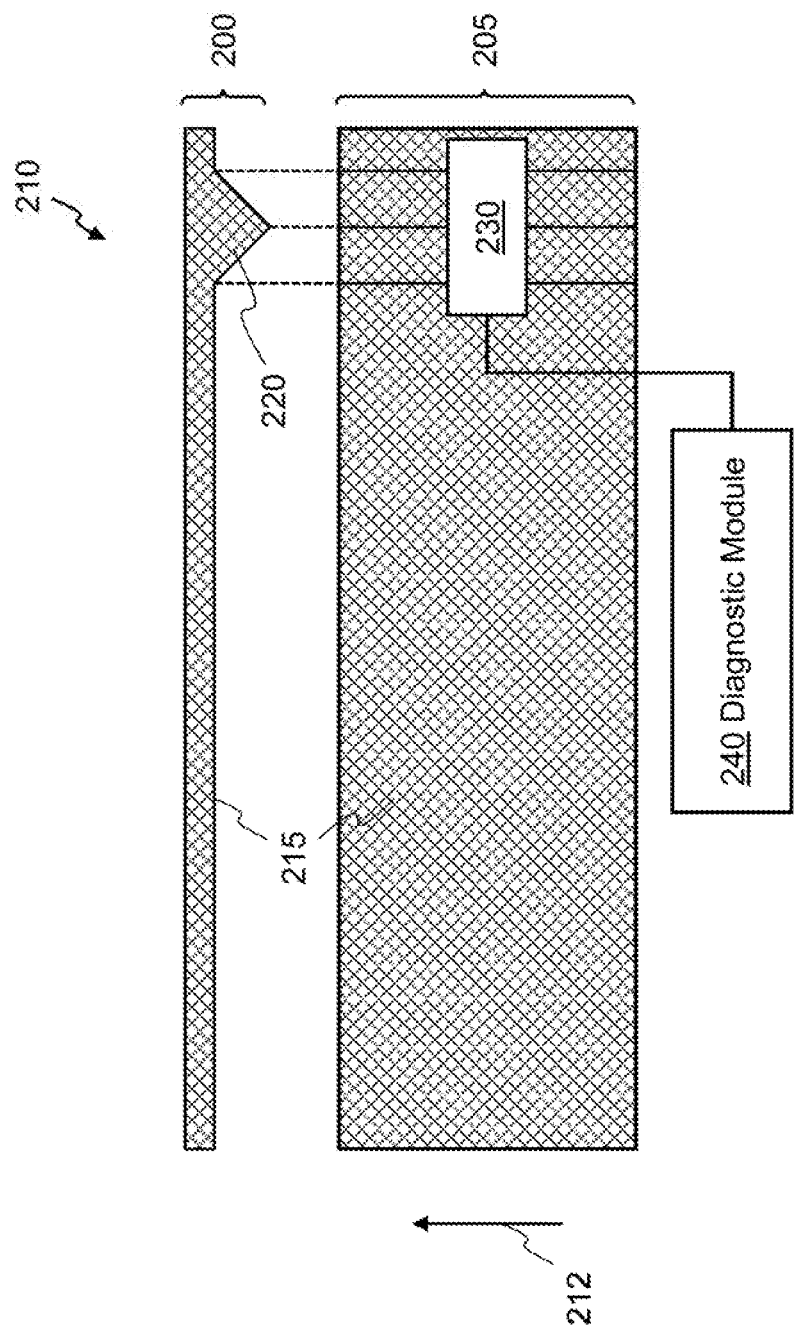
FIG. 2 is a schematic illustration showing corresponding cross sectional views of a conveyor belt for a printing system according to an example.

FIG. 2 shows schematically corresponding cross-sectional views 200 and 205 of an example conveyor belt 210 for a printing system. In certain examples, the conveyor belt 210 shown in FIG. 2 may be implemented as the conveyor belt 110 in the printing system 100 shown in FIG. 1.

As described with reference to the example shown in FIG. 2, the printing system comprises an optical sensor 230, which may be located proximate to an interior surface 215 of the conveyor belt 210. A diagnostic module 240 of the printing system can receive data, related to optical detection of movement of the conveyor belt 210 in a conveyance direction 212, from the optical sensor 230. The conveyance direction 212 may be considered the direction in which the conveyor belt 210 is moving to convey material e.g. print media in the printing system.

In other examples, the optical sensor 230 may additionally or alternatively detect lateral movement of the conveyor belt 210, which may be considered to be movement of the conveyor belt 210 in a lateral direction perpendicular to the conveyance direction 212.

Optical detection of movement of the conveyor belt is described in the examples above with reference FIG. 1. In some examples, an interior surface 215 of the conveyor belt 210 comprises a ridge 220, as shown in FIG. 2. In these examples, the optical sensor 230 may be located proximate to the ridge 220 to detect movement of the ridge 220. The optical sensor 230 can be disposed at any angle relative to the interior surface 215 of the ridged conveyor belt 210 and/or the ridge 220.

In some examples, the optical sensor 230 may detect variations in light on the inherent pattern, texture, or grain of the material of the conveyor belt 210. In particular, the optical sensor 230 may detect variations in light of the ridge 220 to infer movement in the respective region of the conveyor belt 210.

In other examples, the ridge 220 may comprise one or more markings detectable by the optical sensor 230 from which movement of the conveyor belt 210 may be inferred.

Implementing the optical sensor 230 in this way allows the diagnostic module 240 to determine whether the movement of the conveyor belt 210 is in accordance with expected movement of the conveyor belt 210 based on the motion of a driver for the belt 210. As such, the optically detected movement of the conveyor belt 210 can be compared with an expected movement of the conveyor belt 210, the latter being based on data from the driver.

As previously described, the driver may comprise a motor or a motorized shaft, for example, and may also comprise a drive roller. The driver may generally comprise a mechanism or device that can apply a force to the conveyor belt 210 that causes the conveyor belt 210 to move. Data from the driver may be associated with a velocity (e.g. linear or angular) of the driver measured by an encoder coupled to the driver, for example.

Therefore, for a given interval (which may comprise a sub-turn of the conveyor belt 210 as previously described), a movement of the conveyor belt 210 (e.g. a velocity of, or a distance travelled by, the conveyor belt 210) can be: (i) inferred from the motion of the driver advancing the conveyor belt 210, which assumes ideal contact between the driver and conveyor belt 210 (and any intermediate components); and (ii) measured optically by the optical sensor 230. As previously described, the diagnostic module 240 may then determine any difference or discrepancy between the inferred and measured movements of the conveyor belt 210 in order to determine a slippage parameter (which may parametrize slippage between the belt 210 and any rollers or other contact surfaces on which the belt 210 moves).

The V-shaped ridge profile of the ridge 220 shown in FIG. 2 is an example: the ridge 220 may have another profile, for example a trapezoidal or truncated V-shaped ridge profile. In some examples, the interior surface 215 of the conveyor belt 210 comprises a second ridge.

Referring back to FIG. 1, the shape, angle, location, and dimension of the ridge profile on a particular conveyor belt 110 can vary based on the dimensions of the rollers 180, 190 and/or the location, size, and cross sectional profile of a groove in the rollers 180, 190. For example, the dimensions and angles of the ridge profile can correspond to grooves (not shown) in the rollers 180, 190. The ridge profile can be dimensioned to fit into the grooves to help keep the conveyor belt 110 aligned on the rollers 180, 190 and/or with respect to the optical sensor 130 or other devices in the printing system 100.

For example, the drive roller 180 may have a first groove, and the idle roller 190 may have a second groove, with the ridge of the conveyor belt 110 disposed in the first and second grooves to maintain alignment of the conveyor belt 110.

In some examples where the interior surface 215 of the conveyor belt 210 comprises a second ridge, the drive roller 180 may additionally have a third groove, and the idle roller 190 may additionally have a fourth groove, with the second ridge of the conveyor belt 110 disposed in the third and fourth grooves to maintain alignment of the conveyor belt 110.

Figure 3:
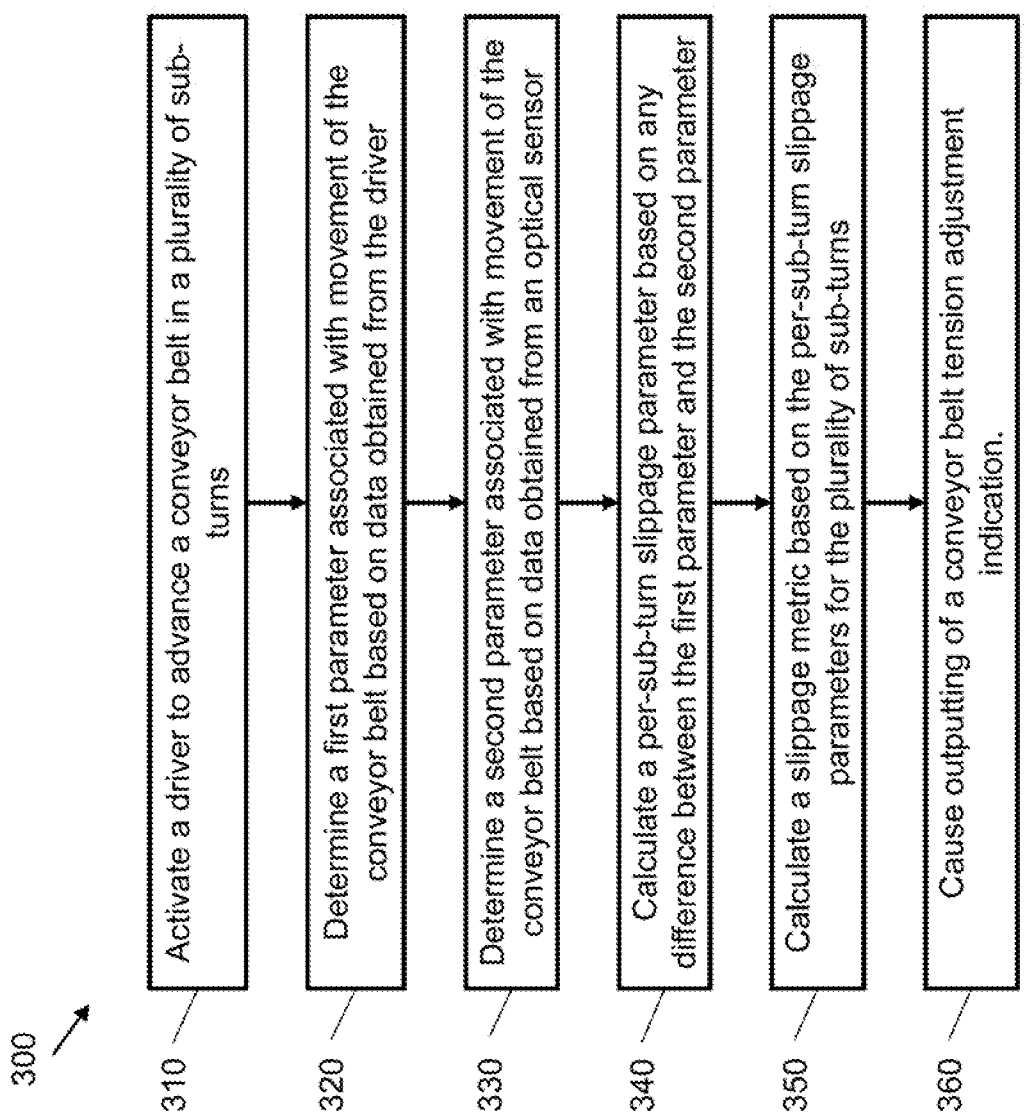
FIG. 3 is a flow diagram showing a method of controlling a printing system according to an example.

FIG. 3 is a flowchart of an example method 300 of controlling a printing system. The printing system may comprise one of the printing system examples previously described. The method begins at block 310 in which a driver is activated to advance a conveyor belt in a plurality of sub-turns. A sub-turn may be considered to be a discrete motion of the conveyor belt that occurs over a distance or time period that is less than that for a complete turn or revolution of the conveyor belt. For example, the conveyor belt may be endless and disposed about rollers, as previously described. As such, a complete turn or revolution of the conveyor belt may be considered a movement of the conveyor belt where the conveyor belt moves in a conveyance direction and returns to its starting position. A full turn of the conveyor belt may comprise a plurality of sub-turns, which may be a series of discrete movements of the conveyor belt that add up to the full turn.

The conveyor belt may be advanced to cause a print media to move relative to a print engine. The driver may comprise a drive roller according to an example previously described thereof. The print media may be disposed on the conveyor belt, and the printing system may comprise another roller, for example an idle roller as described in previous examples.

In examples, activating the driver can include sending drive signals to the driver to move a print media disposed on the conveyor belt in coordination with the operation of the print engine to render a printed image on the print media.

At block 320, a first parameter associated with movement of the conveyor belt is determined, for each of the plurality of sub-turns, based on data obtained from the driver. As previously described with reference to printing system examples, the data from the driver may be associated with a velocity of the driver (e.g. an angular velocity of the drive roller) measured by an encoder coupled to the driver. The data may be obtained by a diagnostic module from the driver or the encoder. In examples employing a drive roller, the encoder may be a shaft encoder associated with a driver comprising a motorized shaft for moving the drive roller.

In some examples, determining the first parameter comprises determining a first distance travelled by the conveyor belt during the respective sub-turn, based on the data obtained from the driver.

In other examples, determining the first parameter comprises determining a first linear velocity of the conveyor belt during the respective sub-turn, based on the data obtained from the driver.

At block 330, a second parameter associated with movement of the conveyor belt is determined, for each of the plurality of sub-turns, based on data obtained from an optical sensor. The optical sensor may be an example of an optical sensor example previously described. The optical sensor may be located proximate to the conveyor belt, for example proximate to an interior surface of the conveyor belt. In certain examples, the interior surface of the conveyor belt comprises a ridge, and the optical sensor may be located proximate to the ridge in these examples. The optical sensor can optically detect movement of the conveyor belt according to the previous description thereof.

In some examples, determining the second parameter comprises determining a second distance travelled by the conveyor belt during the respective sub-turn, based on data obtained from the optical sensor.

In other examples determining the second parameter comprises determining a second linear velocity of the conveyor belt during the respective sub-turn based on data obtained from the optical sensor.

At block 340, a per-sub-turn slippage parameter is calculated based on any difference between the first parameter and the second parameter. For example, where the first and second parameters are determined first and second distances travelled by the conveyor belt during a sub-turn, respectively, the slippage parameter associated with the sub-turn may be based on any difference in the first and second distances. Similarly, where the first and second parameters are determined first and second linear velocities of the conveyor belt during a sub-turn, the slippage parameter associated with the sub-turn may be based on any difference in the first and second linear velocities.

At block 350, a slippage metric is calculated based on the per-sub-turn slippage parameters for the plurality of sub-turns. In some examples, calculating the slippage metric may comprise aggregating the per-sub-turn slippage parameters for the plurality of sub-turns, as previously described with reference to the printing system examples. This aggregate slippage metric may be considered a "total slippage".

In other examples, calculating the slippage metric may comprise, for each of the plurality of sub-turns, comparing the per-sub-turn slippage parameter to a predetermined threshold. For example, where the slippage parameter is based on determined distances travelled by the conveyor belt for each sub-turn, and therefore comprises a distance or length dimension, the predetermined threshold for each sub-turn may comprise a threshold distance. In other examples, where the slippage parameter for each sub-turn comprises a velocity dimension, the predetermined threshold for each sub-turn may comprise a threshold velocity for comparison.

Comparing a per-sub-turn slippage parameter to a predetermined threshold may comprise determining whether the per-sub-turn slippage parameter is less than, equal to, or greater than the predetermined threshold. Each sub-turn may have an associated predetermined threshold for comparing the respective calculated slippage parameter to. Alternatively, multiple sub-turns may have the same associated predetermined threshold for comparing the respective calculated slippage parameters to.

In these examples, calculating the slippage metric may also comprise calculating a proportion of the plurality of sub-turns where the predetermined threshold is exceeded. For example, the calculated slippage metric for each sub-turn may be compared to the associated predetermined threshold, and the number of sub-turns where the predetermined threshold is exceeded may be determined. This number of sub-turns may be compared to the total number of sub-turns in the plurality of sub-turns to give a proportion of the plurality of sub-turns where the predetermined threshold is exceeded. This slippage metric may be considered a "slippage variability", and the preceding description thereof, with reference to printing system examples, applies herein.

At block 360, outputting of a conveyor belt tension adjustment indication is caused. The previous description of the conveyor belt tension adjustment indication, with reference to printing system examples, applies herein.

In some examples, the calculated slippage metric is compared to a predetermined threshold, and outputting of the conveyor belt tension adjustment indication is caused if the predetermined threshold is exceeded. For example, if the total slippage and/or slippage variability metric(s) exceed the respective predetermined threshold, the conveyor belt tension adjustment indication may be caused.

The conveyor belt tension adjustment indication signals that the parameterized slippage of the conveyor belt exceeds a pre-set limit, and that the conveyor belt tension should be adjusted. For example, if the slippage of the conveyor belt is too high, this indication signals that the tension of the conveyor belt is too low and so the tension should be increased to reduce slippage.

Figure 4:
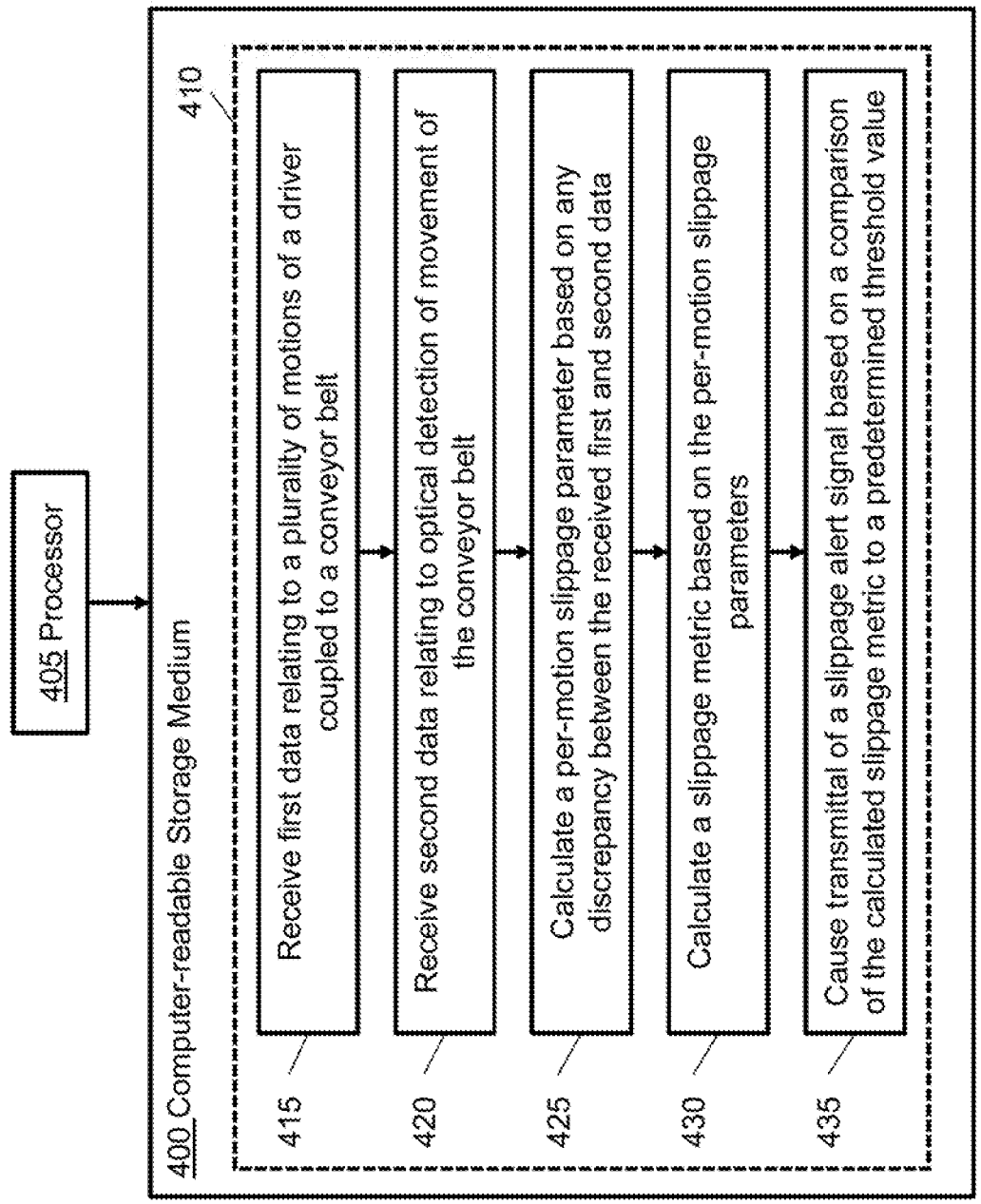
FIG. 4 is a schematic illustration showing a non-transitory computer-readable storage medium, coupled to a processor, and comprising instructions according to an example.

FIG. 4 shows a non-transitory computer-readable storage medium 400, coupled to a processor 405 of a printing system, and comprising computer readable instructions 410 according to an example. The computer readable instructions 410 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 415, the instructions 410 cause the processor 405 to receive first data relating to a plurality of motions of a driver coupled to a conveyor belt. The driver and the conveyor belt may be examples of the respective driver and conveyor belt examples previously described.

At block 420, the instructions 410 cause the processor 405 to receive second data relating to optical detection of movement of the conveyor belt. Optical detection of movement of the conveyor belt may comprise optically detecting movement of the conveyor belt during a motion of the driver. An optical sensor, which may be an implementation of an example optical sensor previously described, may be employed to optically detect movement of the conveyor belt during the plurality of motions of the conveyor belt.

At block 425, the instructions 410 cause the processor 405 to, for each of the plurality of driver motions, calculate a per-motion slippage parameter based on any discrepancy between the received first and second data.

In some examples, calculating the per-motion slippage parameter comprises, for each motion of the driver, determining a first linear velocity of the conveyor belt based on the first data. For example, as previously described, the first data may be associated with a velocity of the driver (e.g. an angular velocity of a drive roller comprised as part of the driver) measured by an encoder coupled to the driver. The first data may be received from the driver or the encoder. The velocity of the driver during a motion of the driver may be used to determine the first linear velocity of the conveyor belt during the respective motion, as previously described with reference to an example employing a drive roller with an angular velocity measured by an encoder (e.g. a shaft encoder associated with a motorized shaft to rotate the drive roller).

In these examples, calculating the per-motion slippage parameter may also comprise, for each motion of the driver, determining a second linear velocity of the conveyor belt based on the second data. For example, optically detected movement of the conveyor belt during a motion of the driver may be converted into a linear velocity of the conveyor belt. As a particular example, an optical sensor may detect that the conveyor belt has moved 1.5 mm in a time period of 0.1 s during a motion of the driver. Therefore, an average linear velocity of the conveyor belt during the motion of the driver may be determined as 15 mm/s from this data.

In these examples, where first and second linear velocities of the conveyor belt are determined for each motion of the driver, calculating the per-motion slippage parameter may also comprise calculating a difference between the first linear velocity and the second linear velocity. Where there is no difference between the determined first and second linear velocities for a motion of the driver, the per-motion slippage parameter for the motion may have a value of zero (e.g. 0 m/s).

In other examples, calculating the per-motion slippage parameter comprises, for each motion of the driver, determining a first distance travelled by the conveyor belt based on the first data. For example, where the first data is associated with a velocity of the driver, an effective distance (the first distance) travelled by the conveyor belt during a motion of the driver can be derived from the velocity of the driver and a time period for the respective motion.

In these examples, calculating the per-motion slippage parameter may also comprise, for each motion of the driver, determining a second distance travelled by the conveyor belt based on the second data. For example, optically detected movement of the conveyor belt during a motion of the driver may be used to determine the second distance travelled by the conveyor belt. Optical detection of movement of the conveyor belt using an optical sensor has been previously described herein, and may be employed as such.

In these examples, calculating the per-motion slippage parameter for each motion of the driver may also comprise calculating a difference between the determined first and second distances. Again, where there is no difference between the determined first and second linear distances for a motion of the driver, the per-motion slippage parameter for the motion may have a value of zero (e.g. 0 m).

At block 430, the instructions 410 cause the processor 405 to calculate a slippage metric based on the calculated per-motion slippage parameters. As described in previous examples herein, calculating the slippage metric may comprise aggregating the per-motion slippage parameters for the plurality of motions of the driver. For example, the plurality of motions may comprise 100 motions of the driver, with a per-motion slippage parameter determined for each of the 100 driver motions. The slippage metric may then be calculated by aggregating the per-motion slippage parameters determined for the 100 driver motions. The result of this calculation may be considered to be a "total slippage" for the plurality of motions of the driver.

In alternative examples, calculating the slippage metric may comprise comparing the per-motion slippage parameter to a predetermined threshold for each of the plurality of motions of the driver, as previously described. Calculating the slippage metric may then comprise calculating a proportion of the plurality of motions where the predetermined threshold is exceeded. The result of this calculation may be considered to be a "slippage variability" for the plurality of motions of the driver. Alternatively, calculating the slippage variability may comprise calculating a proportion of the plurality of motions where the predetermined threshold is not exceeded.

At block 435, the instructions 410 cause the processor 405 to cause transmittal of a slippage alert signal based on a comparison of the calculated slippage metric to a predetermined threshold value. For example, if the determined slippage metric value (e.g. total slippage or slippage variability) exceeds the predetermined threshold value, the slippage alert signal may be caused. In other examples, the slippage alert signal may also be caused if the slippage metric values is equal to the predetermined threshold value. In other examples, the slippage alert signal may alternatively be caused if the slippage metric values is less than the predetermined threshold value.

The slippage alert signal may be a signal transmitted to or by an output device, such as an LED or other light-emitting device, a visual display or monitor, an audio speaker or another means of signaling to a person. The slippage alert signal is a communication (e.g. by the output device) that the parametrized slippage of the conveyor belt is too high compared to pre-set limits. This may be determined based on the determined slippage metric value being above the predetermined threshold value, for example.

The slippage alert signal may be interpreted as the tension of the conveyor belt requiring adjustment. For example, if the determined slippage metric value is above the predetermined threshold value, the slippage alert signal may signal that the tension of the conveyor belt is too low and could be increased to reduce slippage. Upon increasing the tension of the conveyor belt, the instructions 410 may be repeated to determine whether slippage of the conveyor belt is still too high or is within the pre-set limits defined by the predetermined threshold(s).

Calculation of differences has been described in numerous examples throughout the preceding description. Where a difference between a first value and a second value is calculated, this may comprise calculating the absolute difference between the first and second values (i.e. the absolute value of the difference between the first and second values).

The preceding description has been presented to illustrate and describe examples of the principles described. This description is not intended to be exhaustive or to limit these principles to any precise form disclosed. Many modifications and variations are possible in light of the above teaching.

For example, optical sensors are described in the preceding examples to optically detect movement of the conveyor belt. However, examples are envisaged where non-optical sensors are employed, such as magnetic sensors, which can detect movement of the conveyor belt non-optically.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is to be understood that any feature described in relation to any one example may be used alone, or in combination with other features described, and may also be used in combination with any features of any other of the examples, or any combination of any other of the examples.

What is claimed is:

1. A method of controlling a printing system, the method comprising:
 activating a driver to advance a conveyor belt in a plurality of sub-turns, and for each of the plurality of sub-turns:
  determining a first parameter associated with movement of the conveyor belt based on data obtained from the driver;
  determining a second parameter associated with movement of the conveyor belt based on data obtained from an optical sensor; and
  calculating a per-sub-turn slippage parameter based on any difference between the first parameter and the second parameter,
 the method further comprising:
  calculating a slippage metric based on the per-sub-turn slippage parameters for the plurality of sub-turns; and
  causing outputting of a conveyor belt tension adjustment indication.

2. The method of claim 1, wherein for each of the plurality of sub-turns:
 determining the first parameter comprises determining a first distance travelled by the conveyor belt during the respective sub-turn, based on data obtained from the driver; and
 determining the second parameter comprises determining a second distance travelled by the conveyor belt during the respective sub-turn, based on data obtained from the optical sensor.

3. The method of claim 1, wherein for each of the plurality of sub-turns:
 determining the first parameter comprises determining a first linear velocity of the conveyor belt during the respective sub-turn, based on data obtained from the driver; and
 determining the second parameter comprises determining a second linear velocity of the conveyor belt during the respective sub-turn based on data obtained from the optical sensor.

4. The method of claim 1, wherein calculating the slippage metric comprises aggregating the per-sub-turn slippage parameters for the plurality of sub-turns.

5. The method of claim 1, wherein calculating the slippage metric comprises:
 for each of the plurality of sub-turns, comparing the per-sub-turn slippage parameter to a predetermined threshold; and
 calculating a proportion of the plurality of sub-turns where the predetermined threshold is exceeded.

6. The method of claim 1, comprising comparing the slippage metric to a predetermined threshold, and wherein outputting of the conveyor belt tension adjustment indication is caused if the predetermined threshold is exceeded.

7. A non-transitory computer-readable storage medium storing instructions that, if executed by a processor of a printing system, cause the processor to:
 receive first data relating to a plurality of motions of a driver coupled to a conveyor belt;
 receive second data relating to optical detection of movement of the conveyor belt;
 for each of the plurality of driver motions, calculate a per-motion slippage parameter based on any discrepancy between the received first and second data;
 calculate a slippage metric based on the per-motion slippage parameters; and
 cause transmittal of a slippage alert signal based on a comparison of the calculated slippage metric to a predetermined threshold value.

8. The non-transitory computer-readable storage medium of claim 7, wherein calculating the per-motion slippage parameter comprises, for each of the plurality of motions of the driver:
 determining a first distance travelled by the conveyor belt based on the first data;
 determining a second distance travelled by the conveyor belt based on the second data; and
 calculating a difference between the first distance and the second distance.

9. The non-transitory computer-readable storage medium of claim 7, wherein calculating the per-motion slippage parameter comprises, for each of the plurality of motions of the driver:
 determining a first linear velocity of the conveyor belt based on the first data;
 determining a second linear velocity of the conveyor belt based on the second data; and
 calculating a difference between the first linear velocity and the second linear velocity.

10. The non-transitory computer-readable storage medium of claim 7, wherein calculating the slippage metric comprises aggregating the per-motion slippage parameters for the plurality of motions of the driver.

11. The non-transitory computer-readable storage medium of claim 7, wherein calculating the slippage metric comprises:
 for each of the plurality of motions of the driver, comparing the per-motion slippage parameter to a predetermined threshold; and
 calculating a proportion of the plurality of motions where the predetermined threshold is exceeded.

12. A printing system comprising:
 a driver to advance a conveyor belt in a plurality of intervals, wherein each of the plurality of intervals comprises a sub-turn of the conveyor belt;
 an optical sensor to optically detect movement of the conveyor belt; and
 a diagnostic module to:
  determine a first parameter associated with movement of the conveyor belt based on data from the driver;
  determine a second parameter associated with movement of the conveyor belt based on data from the optical sensor;
  for each of the plurality of intervals, calculate a per-interval slippage parameter based on a difference between the first parameter and the second parameter;
  calculate a slippage metric based on the per-interval slippage parameters for the plurality of intervals; and
  based on a comparison of the slippage metric to a predetermined threshold value, cause a conveyor belt tension adjustment indication.

13. The printing system of claim 12, wherein the diagnostic module is to calculate the slippage metric by aggregating the per-interval slippage parameters for the plurality of motions of the driver.

14. The printing system of claim 12, wherein the diagnostic module is to calculate the slippage metric by, for each of the plurality of intervals of the driver, comparing the per-interval slippage parameter to a predetermined threshold and calculating a proportion of the plurality of intervals where the predetermined threshold is exceeded.

15. The printing system of claim 12, wherein the first parameter and the second parameter are each a distance travelled by the conveyor belt in the respective interval of the driver.

\* \* \* \* \*